(12) United States Patent
Cho et al.

(10) Patent No.: US 12,307,049 B2
(45) Date of Patent: May 20, 2025

(54) METHOD OF DRIVING TOUCH PANEL FOR SUPPRESSING EMI EFFECT

(71) Applicant: G2touch Co., Ltd., Seongnam-si (KR)

(72) Inventors: Sung-Won Cho, Seongnam-si (KR); Dong-Won Yun, Seongnam-si (KR)

(73) Assignee: G2touch Co., Ltd., Seongnam-si (KR)

( * ) Notice: Subject to any disclaimer, the term of this patent is extended or adjusted under 35 U.S.C. 154(b) by 0 days.

(21) Appl. No.: 18/402,724

(22) Filed: Jan. 3, 2024

(65) Prior Publication Data

US 2024/0231541 A1    Jul. 11, 2024

(30) Foreign Application Priority Data

Jan. 6, 2023  (KR) .................. 10-2023-0002236

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/04164* (2019.05); *G06F 3/04166* (2019.05); *G06F 3/0443* (2019.05); *G06F 3/0446* (2019.05)

(58) Field of Classification Search
CPC ............... G06F 3/04184; G06F 3/0412; G06F 3/04164; G06F 3/04166; G06F 3/0443; G06F 3/0446; G06F 3/0418; G06F 3/046
See application file for complete search history.

(56) References Cited

U.S. PATENT DOCUMENTS

| | | | | |
|---|---|---|---|---|
| 11,003,226 | B1* | 5/2021 | Brown | H05K 9/0054 |
| 2019/0079624 | A1* | 3/2019 | Kim | G02F 1/1368 |
| 2021/0041981 | A1* | 2/2021 | Chou | G06F 3/0418 |
| 2024/0077973 | A1* | 3/2024 | Kim | G06F 3/0412 |

FOREIGN PATENT DOCUMENTS

| | | |
|---|---|---|
| KR | 20140148360 A | 12/2014 |
| KR | 20170078494 A | 7/2017 |

\* cited by examiner

*Primary Examiner* — Patrick N Edouard
*Assistant Examiner* — Joseph P Fox
(74) *Attorney, Agent, or Firm* — NKL Law; Jae Youn Kim

(57) ABSTRACT

A touch detection device includes a panel including a plurality of electrodes regularly arranged in rows and columns, a connector configured to electrically connect some of the electrodes to form a plurality of sensing channels, and a driver configured to provide driving signals to the sensing channels, wherein the driver parts different edges of the driving signals to different sensing channels.

2 Claims, 7 Drawing Sheets

METHOD OF DRIVING TOUCH PANEL FOR SUPPRESSING EMI EFFECT

BACKGROUND OF THE INVENTION

Field of the Invention

The present invention relates to a method of driving a touch panel, and more particularly to a method of driving a touch panel capable of suppressing an electromagnetic interference (EMI) effect.

Description of the Related Art

EMI is unwanted noise or interference in an electrical path or circuit caused by a source, and is also referred to as radio frequency interference. Due to EMI, electronic devices may improperly operate, malfunction, or completely stop working. EMI may be generated by a natural or man-made source, and the effect of EMI may be reduced by using a high-quality electronic device, electrical shielding, and modern error correction. General examples of EMI include electrical noise heard when a mobile phone is placed near powered audio equipment or speakers.

An electric current, which is movement of electric charges, creates a magnetic field, and a moving magnetic field creates an electric current. An electrical conductor may act as an antenna for radio waves. A high-power electrical and wireless source may have an unwanted effect on a remote device. As an electronic device becomes smaller, faster, denser, and more sensitive, the electronic device becomes more susceptible to an effect of radio waves, resulting in EMI.

Such EMI may start from several sources. For example, a high-power wireless and electrical source may cause unwanted EMI. An improperly designed consumer electronic device may cause EMI to other devices.

SUMMARY OF THE INVENTION

A touch panel includes a plurality of electrodes. An object such as a finger or stylus provides input by changing capacitance between electrodes included in the touch panel. In order for the touch panel to detect the input provided by the object, a driving circuit needs to apply a driving signal, and there is a problem in that EMI formed by the driving signal affects the plurality of electrodes and/or a plurality of driving circuits in the panel, and thus detection performance deteriorates.

A task to be solved by the present invention is to relieve this problem. A task to be solved by the present invention is to provide a method of driving a touch panel capable of reducing an EMI effect in the touch panel.

However, the tasks to be solved by the present invention are not limited to the technical problems mentioned above, and other technical tasks not mentioned here may be clearly understood by those skilled in the art from the description of the present invention.

In accordance with an aspect of the present invention, the above and other objects can be accomplished by the provision of a touch detection device including a panel including a plurality of electrodes regularly arranged in rows and columns, a connector configured to electrically connect some of the electrodes to form a plurality of sensing channels, and a driver configured to provide driving signals to the sensing channels, wherein the driver parts different edges of the driving signals to different sensing channels.

The sensing channels may be one of the electrodes arranged in the rows and the electrodes arranged in the columns.

The driver may output, to the plurality of sensing channels arranged in order, the driving signals in the order.

The sensing channels may include electrodes arranged in a (2n−1)th row, and electrodes arranged in a (2n)th row, wherein n is a natural number.

The sensing channels may include electrodes arranged in a (2n−1)th column, and electrodes arranged in a (2n)th column, wherein n is a natural number.

The driver may output, to the plurality of sensing channels arranged in order, the driving signals in the order.

In accordance with another aspect of the present invention, there is provided a touch detection device including a panel including a plurality of electrodes regularly arranged in rows and columns, a connector configured to electrically connect some of the electrodes to form a plurality of sensing channels, a plurality of drivers configured to provide driving signals to the sensing channels, and a main controller configured to control the drivers, wherein the main controller controls the drivers so that at least one of the drivers starts input sensing at a different time.

The sensing channels may be one of the electrodes arranged in the rows and the electrodes arranged in the columns.

The main controller may be configured to provide driving start signals including edges to the plurality of drivers, respectively, and provide the driving start signals so that the edges of the driving start signals provided to the plurality of drivers, respectively, do not coincide with each other.

The main controller may provide driving start signals so that a rising edge of a driving start signal provided to any one or more of the plurality of drivers coincides with a falling edge of a driving start signal provided to one or more other drivers among the plurality of drivers.

A time between the rising edge of the driving start signal and the falling edge adjacent to the rising edge after the rising edge may be the same as a time between the rising edge of the driving start signal and the falling edge adjacent to the rising edge before the rising edge.

A time between the rising edge of the driving start signal and the falling edge adjacent to the rising edge after the rising edge may be different from a time between the rising edge of the driving start signal and the falling edge adjacent to the rising edge before the rising edge.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
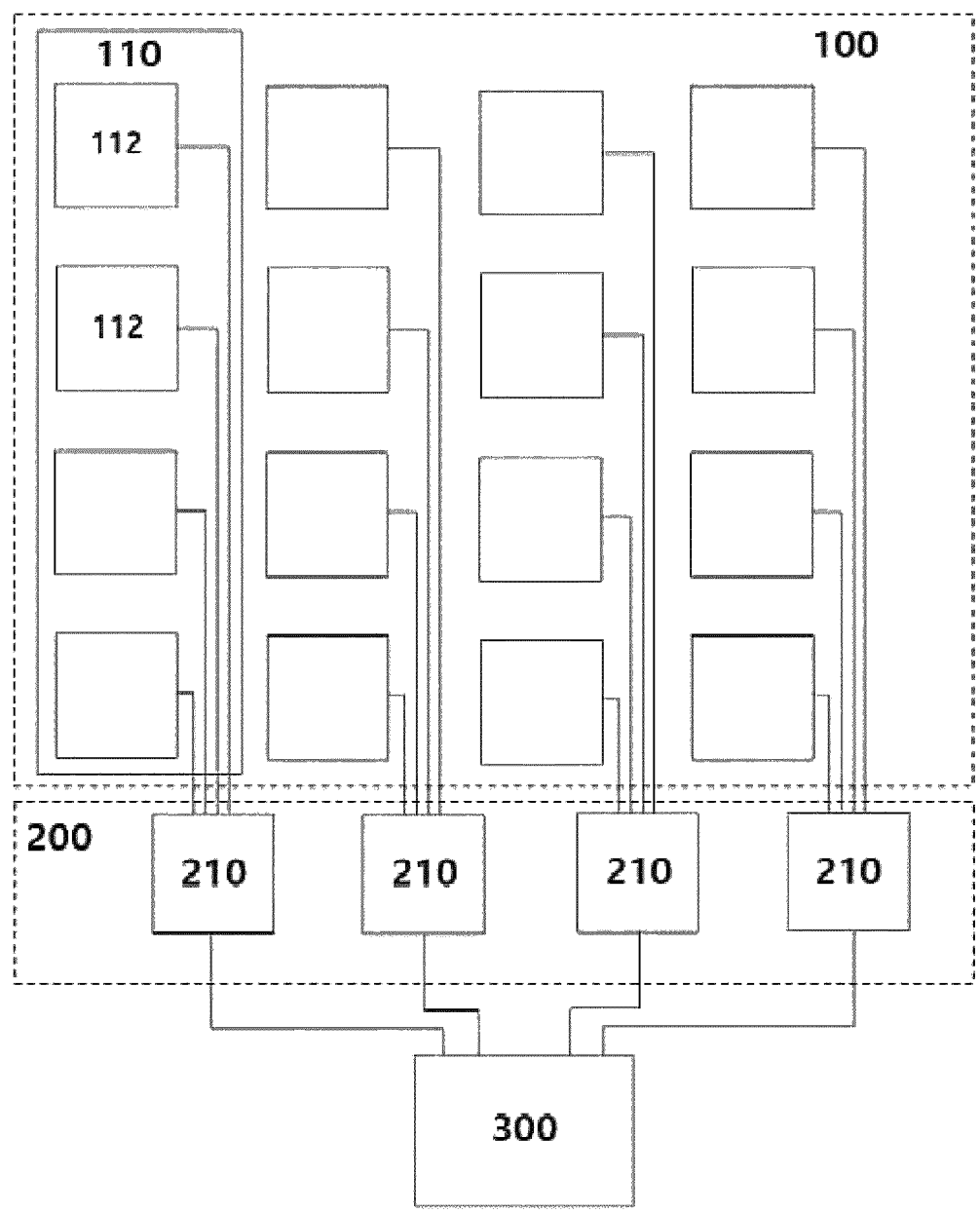
FIG. 1 is a block diagram illustrating an outline of a touch detection device according to the present invention.

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately define a concept of a term to describe the invention of the inventor in the best way possible. Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

FIG. 1 is a block diagram illustrating an outline of a touch detection device 10 according to the present invention.

Referring to FIG. 1, the touch detection device 10 of the present invention includes a panel 100 including a plurality of electrodes 112 regularly arranged in rows and columns, a connector 200 configured to electrically connect some of the electrodes 112 to form a plurality of sensing channels 110, and a driver 300 configured to provide driving signals to the sensing channels 110, and the driver 300 outputs different edges of the driving signals to different sensing channels.

As illustrated in FIG. 1, the panel 100 according to this embodiment may be a self-dot type panel. In the self-dot type panel 100, the plurality of electrodes 112 is regularly arranged in rows and columns. As illustrated in FIG. 1, the electrodes 112 may be square. According to an embodiment not shown, the electrode may have a shape such as a diamond or a triangle, and may be arranged complementary to electrodes in adjacent rows or columns.

The electrodes 112 may function as an electrode that forms a capacitor with an object such as a finger or stylus that provides touch input. As the object approaches the electrodes 112, capacitance of a capacitor formed with the electrodes increases, and as the object moves away from the electrodes 112, the capacitance of the capacitor formed with the electrodes decreases.

The connector 200 includes a plurality of multiplexers 210, and the electrodes 112 are connected to the multiplexers 210 through conductive wires. Each of the multiplexers 210 forms a sensing channel by connecting a plurality of electrodes 112 in rows or columns. In the embodiment illustrated in FIG. 1, the electrodes 112 are connected in a column to form a sensing channel 110. In an embodiment not shown, electrodes are connected in a row to form a sensing channel.

The driver 300 provides a driving signal to the sensing channel 110 to detect a touch input by an object. The embodiment illustrated in FIG. 1 shows an example in which a single driver detects touch input for one panel 100. However, as in an embodiment shown in FIG. 6, a main controller 400 may control a plurality of drivers 300, and each driver 300 may drive the sensing channel 110.

Figure 2:
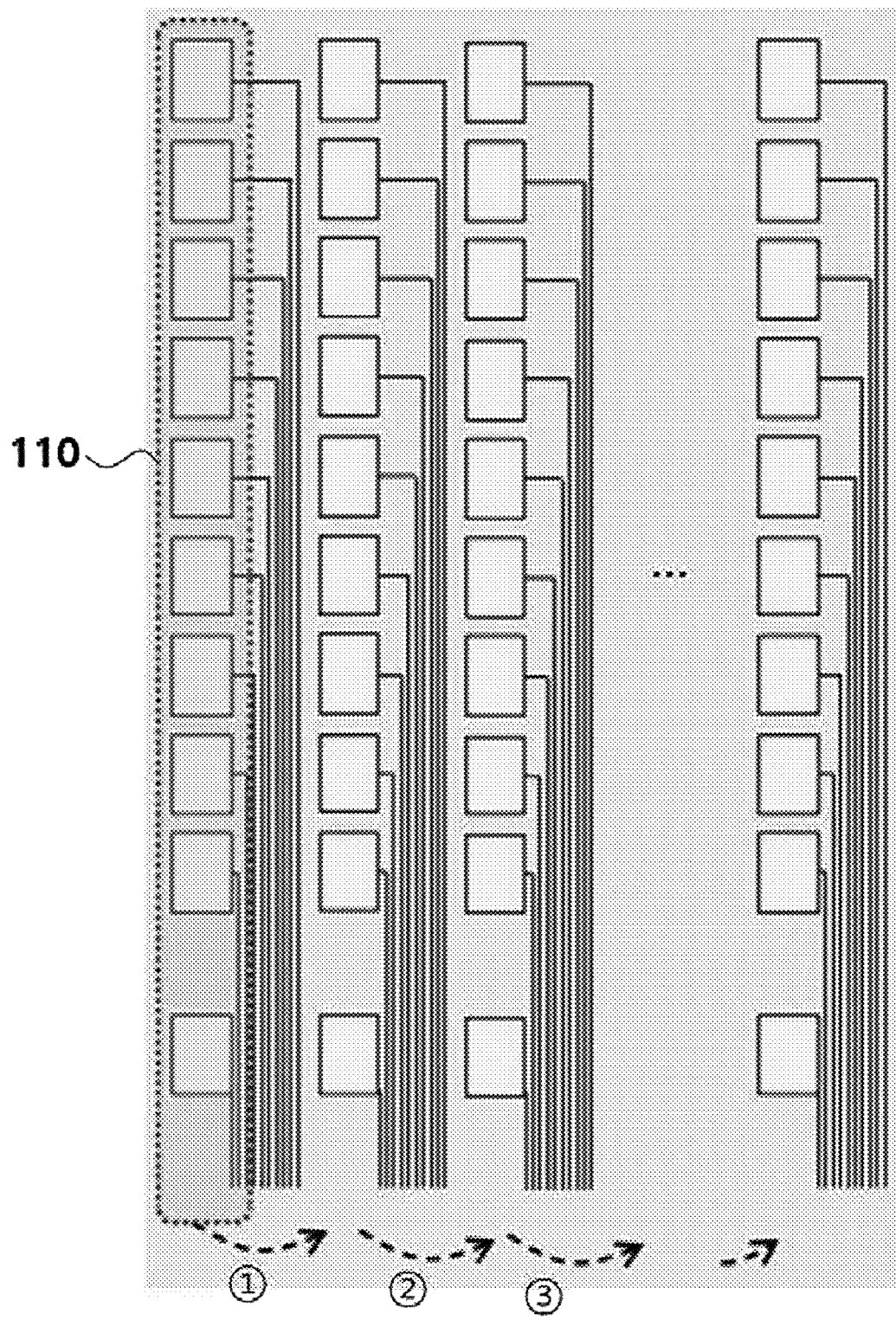
FIG. 2 is a diagram illustrating a state in which electrodes are connected in a column to form a sensing channel.
Figure 3A:
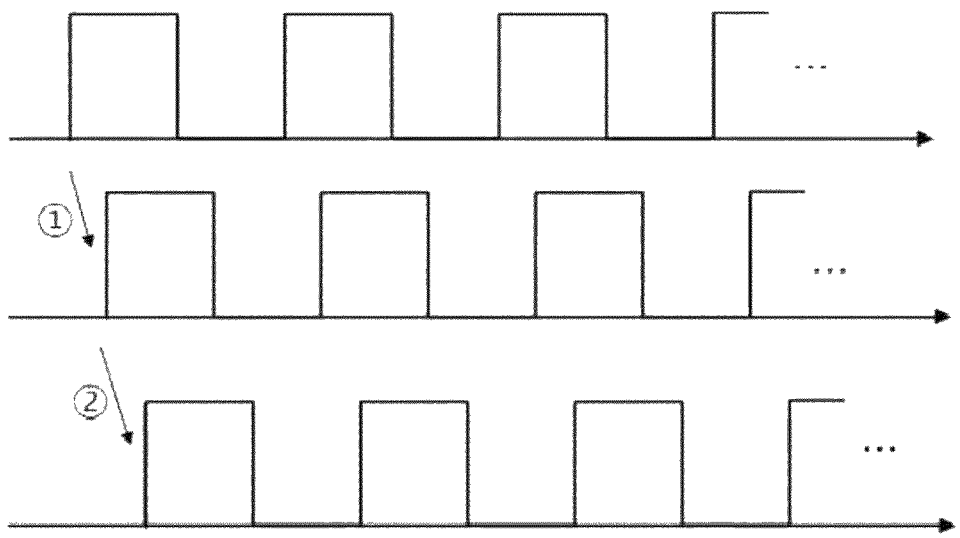
FIGS. 3A and 3B are diagrams illustrating driving signals provided to sensing channels by a driver.
Figure 3B:
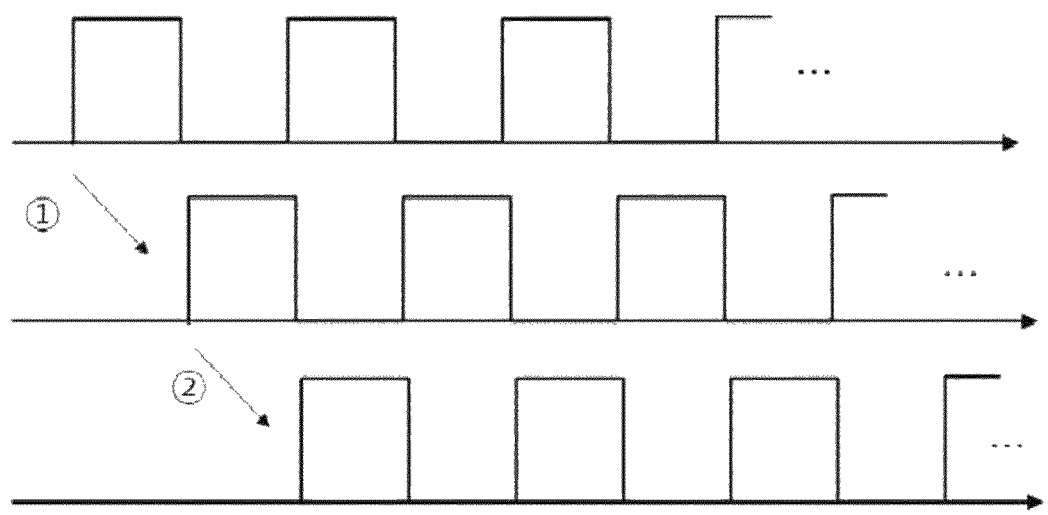

FIG. 2 is a diagram illustrating a state in which electrodes 112 are connected in a column to form a sensing channel 110, and FIGS. 3A and 3B are diagrams illustrating driving signals provided to the sensing channels 110 by the driver 300.

Referring to FIGS. 2, 3A, and 3B, the driver 300 sequentially outputs driving signals to a plurality of sensing channels 110 arranged in order. As shown in the illustrated embodiments, the driver 300 sequentially applies driving signals in order with a time difference so that the same rising edge or the same falling edge of the driving signals is not applied to the plurality of sensing channels 110.

In an embodiment illustrated in FIG. 3A, the driver 300 may provide driving signals so that, within a time between a rising edge and a falling edge of a driving signal provided to one sensing channel 110, a rising edge is included in another adjacent sensing channel 110.

As in an embodiment illustrated in FIG. 3B, the driver 300 may provide driving signals so that a falling edge of a driving signal provided to one sensing channel 110 is synchronized with a rising edge of a driving signal provided to another adjacent sensing channel 110. As in the embodiment illustrated in FIG. 3A and the embodiment illustrated in FIG. 3B, the effect of EMI may be suppressed by providing driving signals to the sensing channels.

Figure 4:
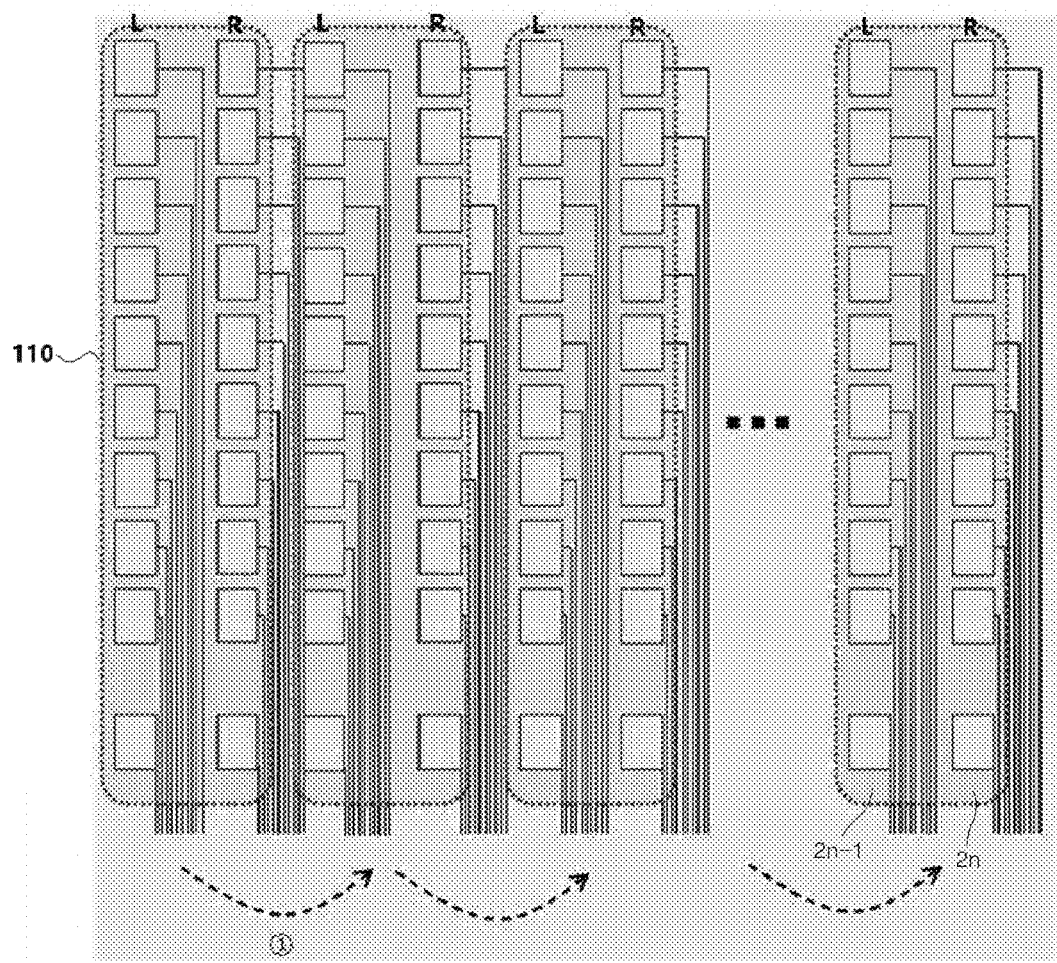
FIG. 4 is a diagram illustrating electrodes arranged in a column 2n−1 and electrodes arranged in a column 2n forming one sensing channel.
Figure 5A:
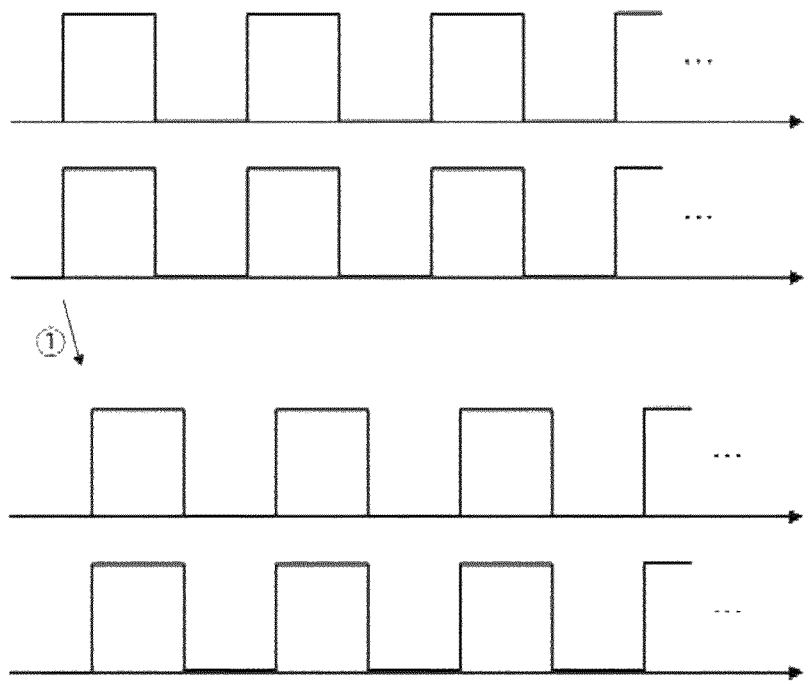
FIGS. 5A and 5B are diagrams illustrating driving signals provided to the sensing channels illustrated in FIG. 4.
Figure 5B:
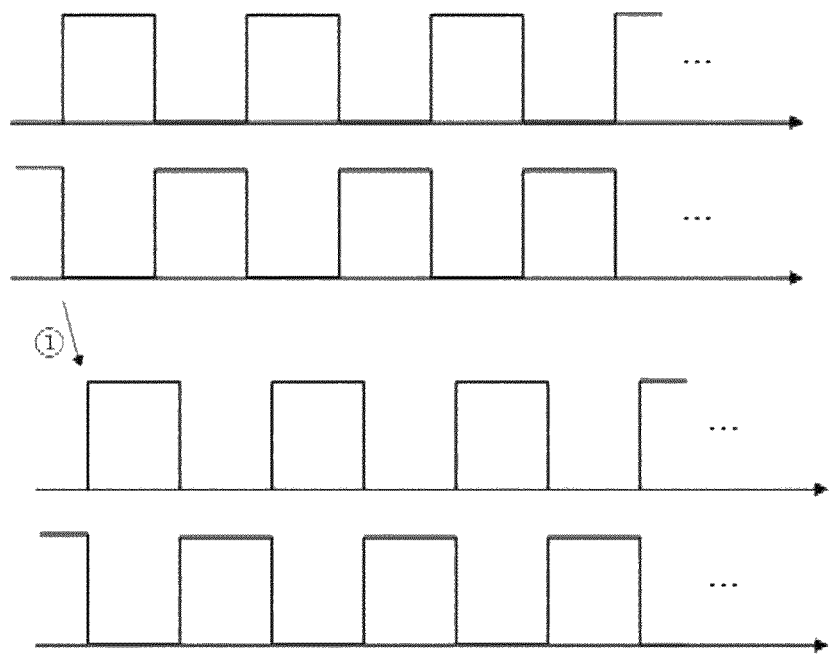

FIG. 4 is a diagram illustrating electrodes arranged in a column 2n−1 and electrodes arranged in a column 2n forming one sensing channel 110. FIGS. 5A and 5B are diagrams illustrating driving signals provided to the sensing channels 110 illustrated in FIG. 4.

Referring to FIGS. 4 and 5A, the driver 300 may provide the same driving signal to a left column L and a right column R included in the sensing channel 110. As shown in the example, the driver 300 provides the driving signals so that a rising edge of a driving signal provided to the left column L and a rising edge of a driving signal provided to the right column R are synchronized with each other, and a falling edge of the driving signal provided to the left column L and the rising edge of the driving signal provided to the right column R are synchronized with each other.

In addition, the driver 300 may provide driving signals to one sensing channel 110 and another adjacent sensing channel with a phase difference between the driving signals so that the same edges do not overlap each other.

Referring to FIGS. 4 and 5B, the driver 300 may provide driving signals having an inverted relationship to the left column L and right column R included in the sensing channel 110. As shown in the example, the driver 300 provides the driving signals so that a rising edge of a driving signal provided to the left column L and a falling edge of a driving signal provided to the right column R are synchronized with each other, and a falling edge of the driving signal provided to the left column L and a rising edge of the driving signal provided to the right column R are synchronized with each other. In addition, the driver 300 may provide driving signals to one sensing channel 110 and another adjacent sensing channel with a phase difference between the driving signals. The effect of EMI may be suppressed by providing the driving signals to the sensing channels as in the embodiments illustrated in FIGS. 4A and 4B.

Hereinafter, a description will be given of an embodiment in which a main controller controls a plurality of drivers. In a conventional art, when the main controller controls the plurality of drivers, in response to the main controller transmitting a sensing start signal to a master driver, the master driver parts a sensing sync signal to a slave driver, and the drivers perform sensing in synchronization with the sensing sync signal. However, when the master driver and the slave driver are synchronized with the sensing sync signal to provide a driving signal to the touch panel, a peak value of a current increases, so that EMI has a significant effect.

Figure 6:
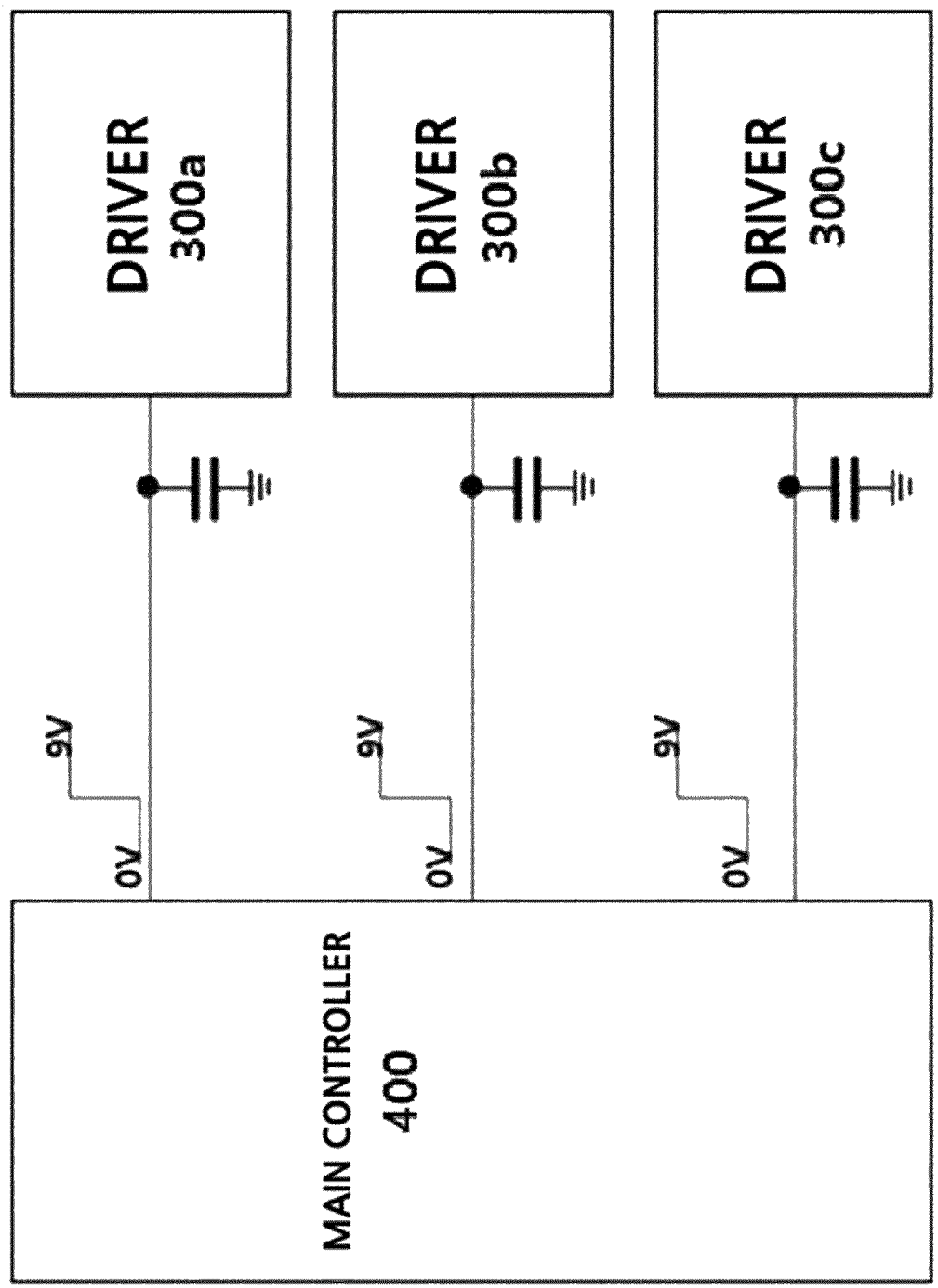
FIG. 6 is a diagram illustrating a connection relationship between a main controller and a plurality of drivers according to this embodiment.

In the present invention, the main controller suppresses the effect of EMI by controlling the drivers so that at least one of the plurality of drivers starts input sensing at different times. FIG. 6 is a diagram illustrating a connection relationship between the main controller 400 and the plurality of drivers 300 according to this embodiment, and FIGS. 7A to 7C are diagrams illustrating voltage waveforms and current waveforms of signals provided to the plurality of drivers 300 by the main controller 400.

Figure 7A:
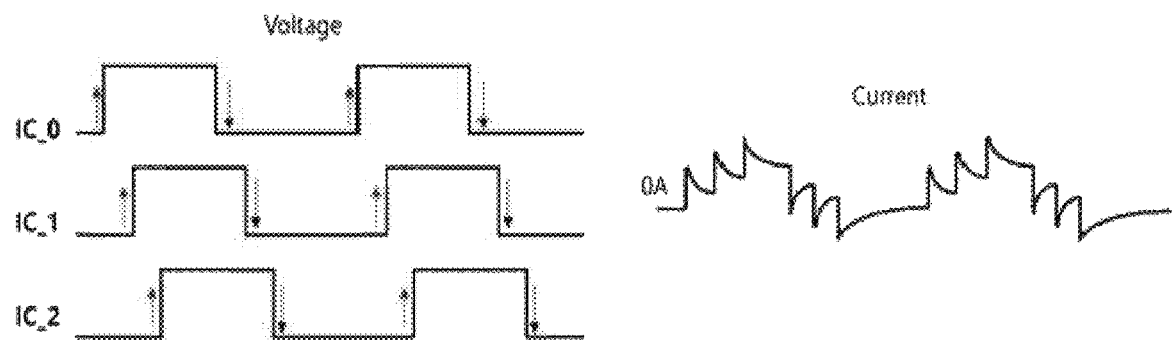
FIGS. 7A to 7C are diagrams illustrating voltage waveforms and current waveforms of signals provided to the plurality of drivers by the main controller.

Referring to FIG. 7A, the main controller 400 forms and provides start signals provided to a plurality of drivers 300a, 300b, and 300c, respectively, so that rising edges thereof do not coincide with each other. Therefore, it can be seen that edges of voltage signals do not coincide with each other, and thus a current does not rise or fall significantly, and the magnitude of an electromagnetic field generated therefrom decreases compared to the conventional art.

Figure 7B:
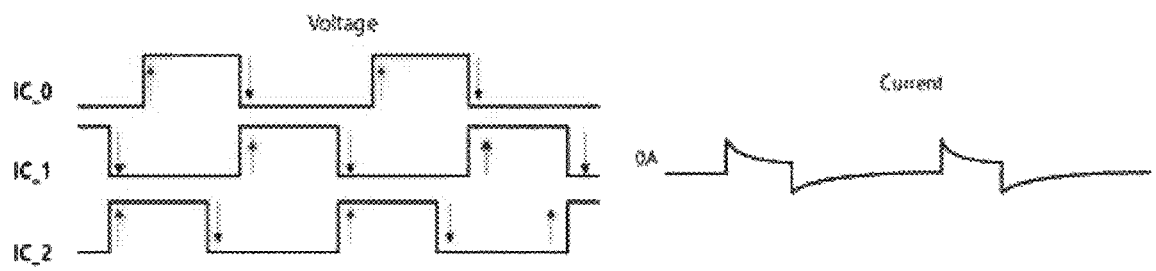
Figure 7C:
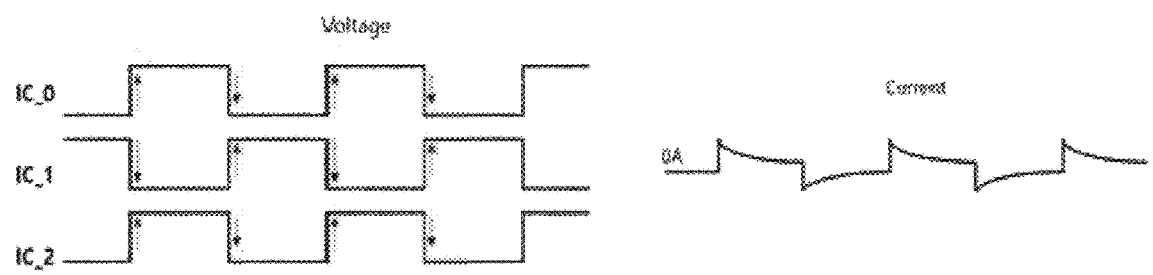

In embodiments illustrated in FIGS. 7B and 7C, the main controller 400 may provide driving start signals so that a rising edge of a driving start signal provided to any one or more of a plurality of drivers coincides with a falling edge of a driving start signal provided to one or more other drivers among the plurality of drivers. As the rising edge and the falling edge coincide with each other, currents in opposite directions are formed, so that generation of an electromagnetic field may be suppressed.

As illustrated in FIG. 7B, the main controller 400 may provide driving start signals in which a time between a rising edge of a driving start signal and a falling edge adjacent to the rising edge after the rising edge is different from a time between a rising edge of a driving start signal and a falling edge adjacent to the rising edge before the rising edge.

Further, as illustrated in FIG. 7C, the main controller 400 may provide driving start signals having the same duty ratio since a time between a rising edge of a driving start signal and a falling edge adjacent to the rising edge after the rising edge is the same as a time between a rising edge of a driving start signal and a falling edge adjacent to the rising edge before the rising edge.

According to the present invention, an advantage is provided in that the EMI effect may be effectively suppressed in a touch detection device.

The effect of the present invention is not limited to that mentioned above, and other tasks not mentioned here will be clearly understood by those skilled in the art from the above description.

Even though the present invention has been described above in relation to specific embodiments of the present invention, this is only an example and the present invention is not limited thereto. A person of ordinary skill in the technical field to which the present invention pertains may change or modify the described embodiments without departing from the scope of the present invention, and various modifications and variations are possible within the scope of equivalence of the technical idea of the present invention and the scope of the patent claims described below.

What is claimed is:

1. A touch detection device comprising:
   a panel comprising a plurality of electrodes regularly arranged in rows and columns;
   a connector configured to electrically connect some of the plurality of electrodes to form a plurality of sensing channels;
   a plurality of drivers configured to provide driving signals to the plurality of sensing channels; and
   a main controller configured to control the plurality of drivers,
   wherein the main controller controls the plurality of drivers so that at least one of the plurality of drivers starts input sensing at a different time,
   wherein the main controller is configured to provide driving start signals so that a rising edge of one driving start signal provided to any one or more of the plurality of drivers coincides with a falling edge of another driving start signal provided to one or more other drivers of the plurality of drivers, and
   wherein a first time period between the rising edge of the one driving start signal and a first falling edge generated right before the rising edge is different from a second time period between the rising edge of the one driving start signal and a second falling edge generated right after the rising edge.

2. The touch detection device according to claim 1, wherein the plurality of sensing channels are one of the plurality of electrodes arranged in the rows or the plurality of electrodes arranged in the columns.

* * * * *